Aug. 14, 1945.　　　D. N. KELLY　　　2,382,486
MATTRESS BORDER STITCHING MACHINE
Filed April 14, 1941　　　7 Sheets-Sheet 1

Aug. 14, 1945.　　　D. N. KELLY　　　2,382,486
MATTRESS BORDER STITCHING MACHINE
Filed April 14, 1941　　　7 Sheets-Sheet 2

Aug. 14, 1945.　　　D. N. KELLY　　　2,382,486
MATTRESS BORDER STITCHING MACHINE
Filed April 14, 1941　　　7 Sheets-Sheet 3

Fig. 3

Inventor:
Dwight N. Kelly
By

Aug. 14, 1945.  D. N. KELLY  2,382,486
MATTRESS BORDER STITCHING MACHINE
Filed April 14, 1941  7 Sheets-Sheet 4

Inventor:
Dwight N. Kelly
By J. Lee & J. Lee Attys.

Aug. 14, 1945.     D. N. KELLY     2,382,486
MATTRESS BORDER STITCHING MACHINE
Filed April 14, 1941     7 Sheets-Sheet 5

Aug. 14, 1945.　　　　D. N. KELLY　　　　2,382,486
MATTRESS BORDER STITCHING MACHINE
Filed April 14, 1941　　　7 Sheets-Sheet 6

Inventor:
Dwight N. Kelly

Patented Aug. 14, 1945

2,382,486

UNITED STATES PATENT OFFICE 2,382,486

MATTRESS BORDER STITCHING MACHINE

Dwight N. Kelly, Chicago, Ill., assignor to A. Brandwein & Company, Chicago, Ill., a corporation of Illinois Application April 14, 1941, Serial No. 388,417

10 Claims. (Cl. 112—117)

The invention relates generally to stitching machines and more particularly to a machine for making parallel lines of stitching on mattress borders or the like.

The invention has among its objects the production of such a machine which will automatically stitch a plurality of rows of parallel lines of stitching, the ends of which lines terminate intermediate the edges of the material, which machine is very durable, dependable and efficient.

Another object of the invention is the production of such a machine wherein the stitching mechanism reciprocates across the material to be stitched in combination with means for stopping the stitching mechanism at the end of the stitching operation, cutting the thread, returning the machine to its initial position, and starting the machine again at the beginning of the next line of stitching, all of said operations being performed in synchronism with one another.

A further object of the invention is the production of novel means for cutting the thread at the end of the stitching operation.

A further object of the invention is the production of novel means for holding the material in position while being stitched.

Other objects of the invention are the improvements in stitching mechanisms of the type described, in sundry details as will be apparent to those skilled in the art from the disclosure hereinafter given.

In the drawings wherein like reference characters indicate like or corresponding parts.

The machine illustrated is adapted to stitch a series of parallel lines of stitching on a relatively narrow strip or strips of material such as a border boxing adapted to enclose the side and end edges of a mattress. The lines of stitching extend transversely to the strip and terminate at points spaced from the adjacent edges of the material. To accomplish this result the border comprising one or more plies of material which are to be stitched, is intermittently fed across the machine, and the stitching mechanism which is transversely movable relative the material is reciprocated across the same to form the line of stitching. When the stitching mechanism has reached the end of its stitching operation it is automatically stopped, the thread is cut and the stitching mechanism returned to its initial position. Simultaneously, the material is advanced a step to bring it in position for the next line of stitching, after which the cycle is repeated.

Figure 1:
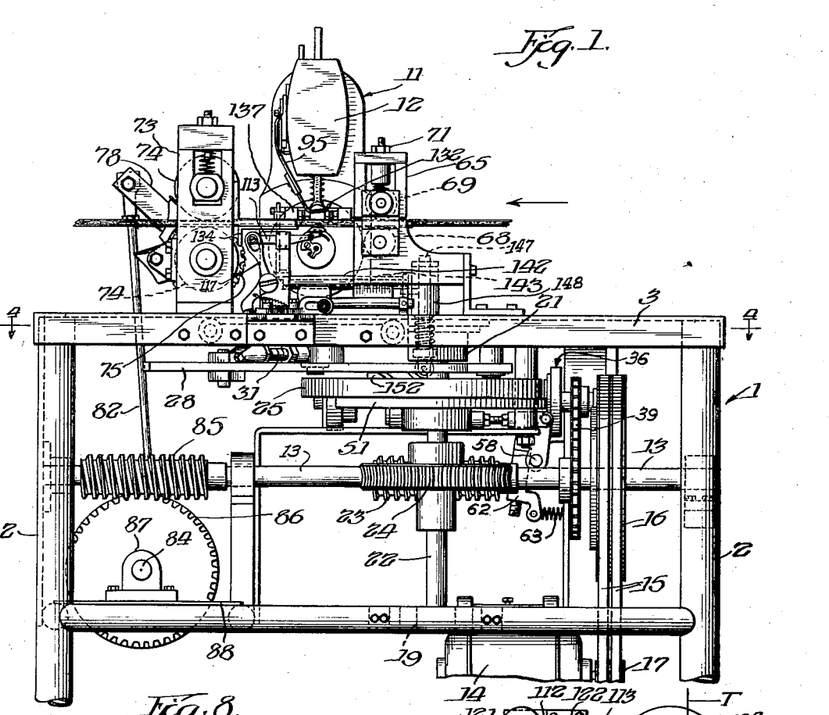
Fig. 1 is a front elevational view of a machine embodying the present invention.
Figures 2, 10:
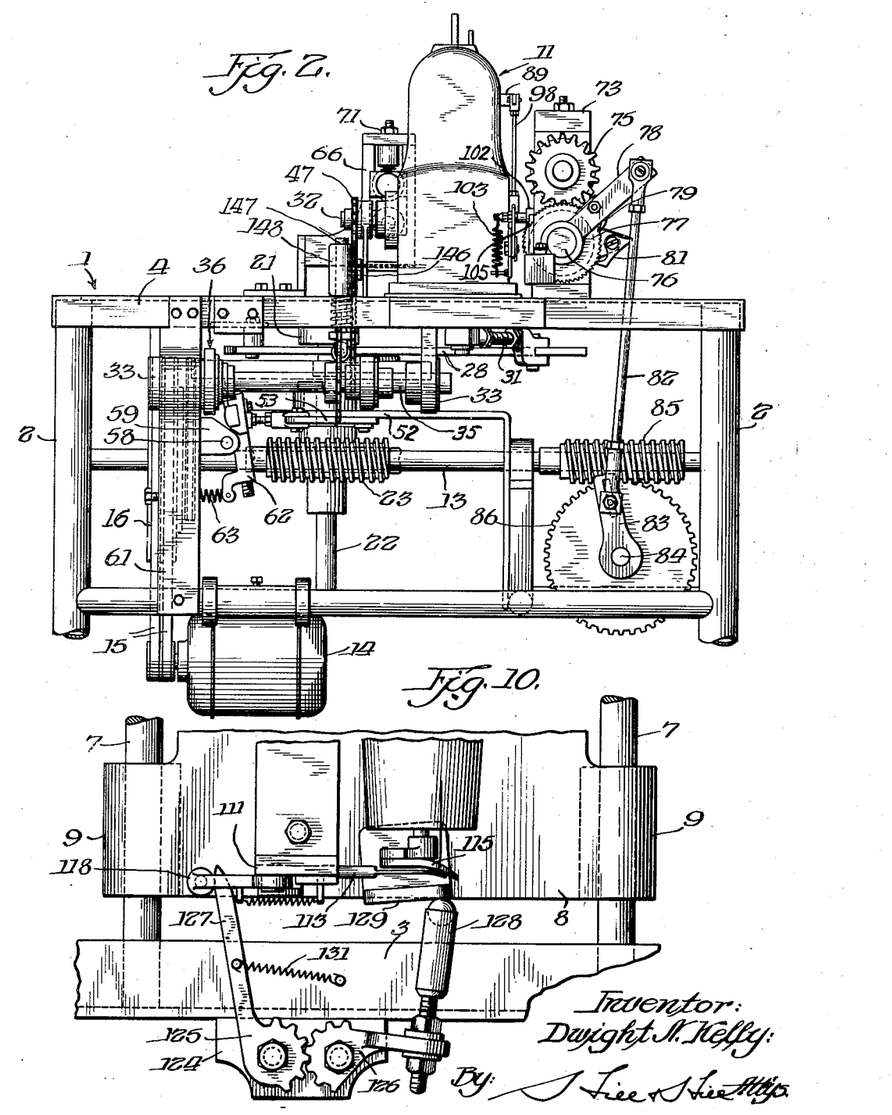
Fig. 2 is a rear elevational view of the machine illustrated in Fig. 1.
Fig. 10 is a top plan view of the cutting mechanism illustrated in Figs. 8 and 9.
Figure 3:
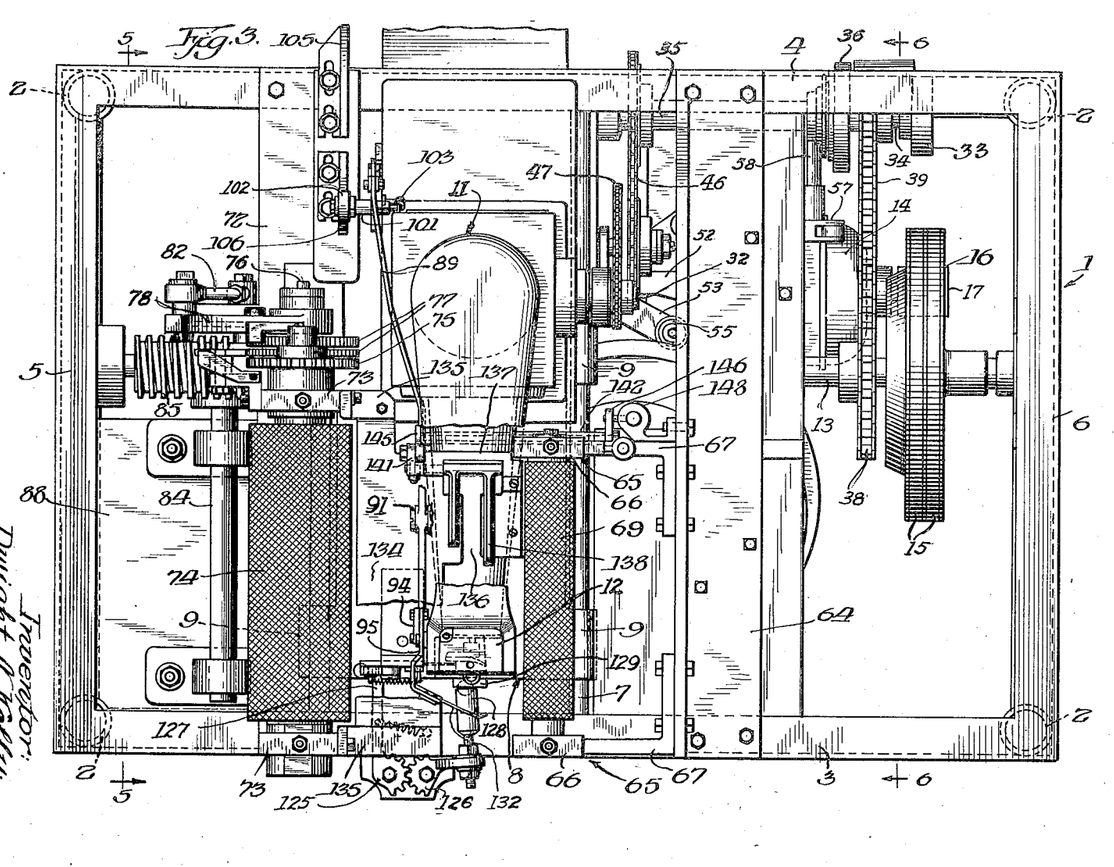
Fig. 3 is a top plan view of the machine with a portion of the stitching machine head broken away.
Figure 6:
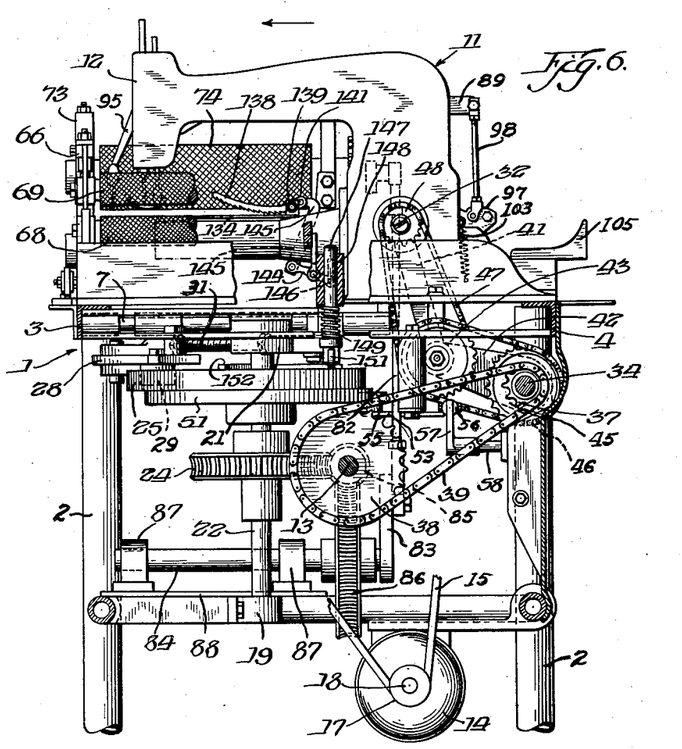
Fig. 6 is a sectional view taken approximately on the line 6—6 of Fig. 3 with a portion of the hold-down mechanism illustrated in section.

In general, as illustrated in Figs. 1, 2 and 3, the machine comprises a supporting frame, designated generally by the numeral 1, comprising legs 2 connected adjacent their upper ends by front and rear cross members 3 and 4, respectively, and end members 5 and 6, respectively. Extending between the front and rear members 3 and 4 are a pair of spaced tubular ways 7. Slidably carried by the ways 7 is a carriage, designated generally by the numeral 8, the latter having bearing portions 9 engageable with the ways 7. Mounted on the carriage 8 is a stitching mechanism, designated generally by the numeral 11, the latter in the present instance being of the so-called chain stitch type and having the usual stitching head 12. Suitably journaled in the supporting frame 1 is a main drive shaft 13, the latter being connected with a suitable source of power such as a motor 14, by the belts 15 or other suitable means, carried on pulleys 16 and 17 secured to the shaft 13 and motor drive shaft 18, respectively, the motor 14 being mounted on suitable cross members carried by the supporting frame 1. Journaled in suitable bearings 19 and 21, as shown in Figs. 2 and 6 is a vertically extending shaft 22 operatively connected to the shaft 13 by the worm 23 and worm wheel 24 carried by the shafts 13 and 22 respectively. Rigidly secured to the shaft 22 is a main cam disk 25 which is provided in its upper face with a cam slot 26 clearly shown in Fig. 4. Pivotally carried by the cross member 27 of the supporting frame 1 is a lever 28 having a roller 29 positioned in the cam slot 26. An adjustable link 31 pivotally secured at its ends to the carriage 8 and the lever 28 respectively, operatively connects the carriage to the lever 28 so that upon rotation of the cam disk 25 the carriage 8 will be reciprocated on the ways 7.

*The stitching mechanism construction*

Figure 4:
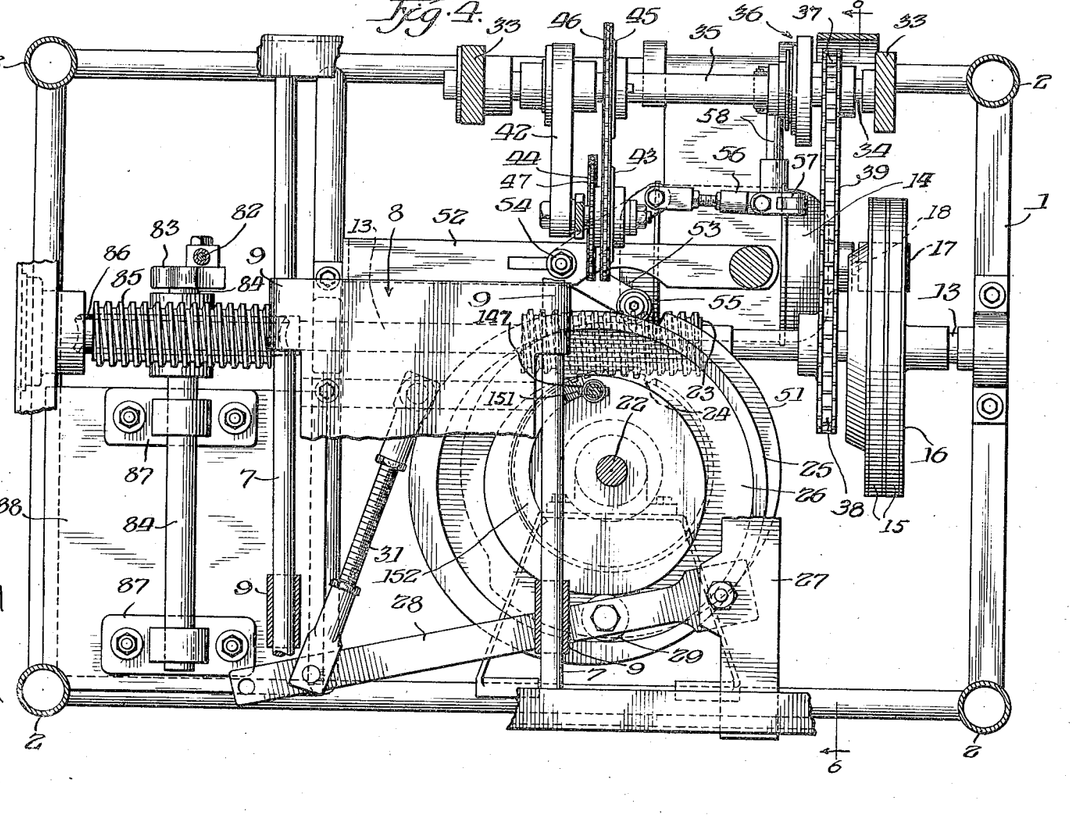
Fig. 4 is a sectional view taken approximately on the line 4—4 of Fig. 1.

As previously mentioned the stitching mechanism illustrated is in general similar to the usual chain stitch mechanism of this type and is actuated by means of a drive shaft 32 extending from one side of the device. Journaled in bearings 33 as shown in Figs. 2 and 4 is a jack shaft consisting of a pair of axially aligned shafts 34 and 35 connected to one another through a stop motion mechanism clutch designated generally by the numeral 36, the latter is of ordinary construction and operatively connects the adjacent ends of the shafts 34 and 35.

Briefly the stop motion mechanism 36 (Figs. 2, 4 and 13 to 16 inclusive) comprises a cylindrical housing 36a rigidly mounted on the drive shaft 34 and containing a clutch disc 36b which is rigidly mounted on the driven shaft 35 and rotates with the housing when clutched thereto.

Figure 15:
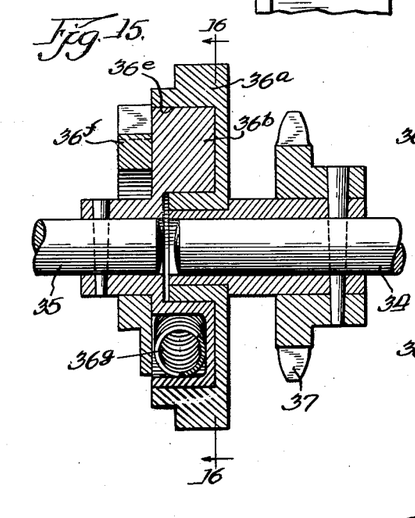
Fig. 15 is a detail diametrical section through the clutch taken on the line 15—15 of Fig. 16.
Figure 16:
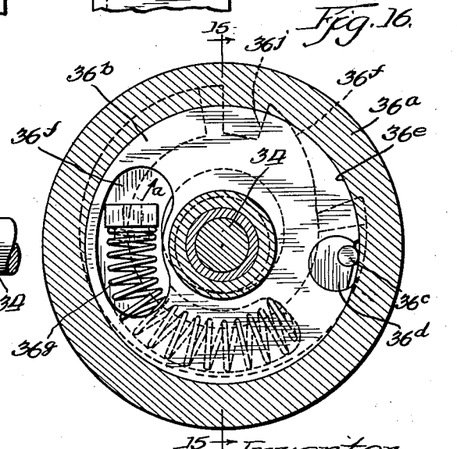
Fig. 16 is a cross section taken on the line 16—16 of Fig. 15.

A roller 36c contained in a socket in a stub shaft 36d rotatively mounted in the clutch disc adjacent its periphery, cooperates with the housing 36a to clutch the clutch disc thereto. When in clutched condition the roller bears against the internal cylindrical face 36e of the cylindrical part of the housing.

Mounted adjacent the outer face of the clutch disc is a clutch collar 36f which is carried by the stub shaft 36d and is urged in the direction of the arrow "a" (Fig. 16) by a coiled compression spring 36g until the stub shaft 36d has frictionally engaged the roller 36c with the internal cylindrical face 36e of the cylindrical part of the housing. To unclutch the roller 36c from the internal cylindrical face of the housing, the clutch collar 36f is partially rotated in a contra-clockwise direction and therewith the stub shaft is rotated in the same direction, thereby retracting the roller from its engagement with said internal cylindrical face of the housing.

Cooperating with the clutch collar is the hereinafter described actuating lever 62 which has a finger or lug 36i that is adapted to enter a notch 36j in the clutch collar when the sewing machine arrives at the end of each line of stitches, and thereby positively stop the stitching mechanism with its needle in raised position.

The actuating lever 62 is swung into its operative position for unclutching the clutch mechanism by a spring 63, and is swung into inoperative position by the hereinafter described cam 51, roller 55, arm 53, link 56, rocker arm 57 and shaft 58. (See Figs. 2 and 4.) At the end of a line of stitches the roller 55 runs off the high face of the cam and the spring 63 swings the actuating lever 62 against the front face of the clutch collar 36f which runs along the finger or lug 36i until the notch registers therewith; the spring 63 then projects the finger into the notch, positively stopping the clutch collar, the clutch disc, the shaft 35 and the stitching mechanism at a predetermined point in the rotational movement of the clutch disc.

The clutch collar has a cylindrical edge 36k eccentrically disposed with respect to the axis of the shaft 35 and so disposed with respect to the notch that it engages the finger 36i of the actuating lever directly before the notch reaches the finger. Engagement of the eccentric edge with the finger of the actuating lever causes the clutch collar to be partially rotated on the axis of the stub shaft 36d, thereby partially rotating said stub shaft slightly in a contra-clockwise direction and moving the clutch roller out of frictional engagement with the internal face of the cylindrical part of the housing. Momentum carries the clutch disc and clutch collar around until the finger is projected into the notch.

The stop motion mechanism shown and described is the standard stop motion clutch mechanism used in the Singer buttonhole sewing machine.

Reference is here made to Letters Patent of the U. S. No. 863,129, dated August 13, 1907, issued to The Singer Manufacturing Company, assignee of E. B. Allen, for an improvement in stop motion device for sewing machines, which patent discloses stop motion mechanism generally similar to that disclosed in the present application.

By means of the clutch and stop motion mechanism 36 to the shafts 34 and 35 may be rigidly secured to one another and rotate as a single shaft or the two shafts may freely rotate relative to one another when so desired. The specific details of the clutch and stop motion mechanism 36 form no part of the present invention as any suitable clutch of this type that stops the driven shaft in a predetermined angular position may be employed of which there are numerous types on the market. Referring to Fig. 6 shaft 34 is operatively connected to the shaft 13 by means of sprockets 37 and 38 carried by the respective shafts and chain 39. Pivotally carried at one end by the shaft 32 is an arm 41, see Fig. 6, which is pivotally connected at its free end to a second arm 42 which is pivotally secured at its opposite end by the shaft 35. Carried by one of said arms and rotatable on the common axis of said arms is a pair of sprockets 43 and 44 respectively, the latter being rigidly connected with one another. The sprocket 43 is operatively connected to a sprocket 45 carried by the shaft 35 by means of a chain 46 and the sprocket 44 is operatively connected by a chain 47 to a sprocket 48 rigidly connected to the driving shaft 32 of the stitching mechanism. Thus, the shafts 32 and 35 are positively connected at all times, although the shaft 32 may move towards and away from the shaft 35 as the carriage 8 is reciprocated.

As illustrated in Figs. 4 and 6, the clutch stop motion mechanism 36 is actuated by a cam disk 51 carried by the shaft 22 and positioned directly below the cam disk 25. Pivotally mounted on a stationary cross member 52 of the supporting frame 1 is an L-shaped arm 53, the later being pivotally connected to the member 52 as shown at 54. Carried by one end of the arm 53 is a roller 55 engageable with the cam 51. The opposite end of the arm 53 is connected by means of a link 56 to a rocker arm 57, the latter being carried by a shaft 58, journaled in a bearing block 59 which is secured to the vertical strut 61 of the supporting frame 1, see Figs. 2 and 6. Carried by the shaft 58 is the actuating lever 62 engageable with the clutch and stop motion mechanism 36 to actuate the later. A spring 63 acting through the various links and levers urges the roller 55 in engagement with the cam disk 51, the latter being so designed and shaped relative to the cam slot 26 that the lever 62 will be maintained in a position whereby the shafts 34 and 35 are locked to one another while the stitching mechanism is being translated in a forward direction as illustrated by the arrow in Fig. 6.

*Feeding mechanism*

Extending between the members 3 and 4 of the supporting frame 1 is a cross member 64, Fig. 3 to which is secured standards designated generally by the numeral 65 comprising vertical portions 66 and horizontal portions 67 which are secured to the cross member 64. Journaled in the standards or uprights 66 is a lower roller 68 and an upper roller 69, see Figs. 1 and 6, the latter being transversely movable relative to the roller 68 and urged toward the latter by a spring or other suitable means which may be adjusted by means of the nut 71. Any suitable roller construction may be employed.

Mounted on a cross member 72, shown in Fig. 3, is a second pair of uprights or standards 73 which carry a pair of feed rollers 74. The feed rollers 74 as best illustrated in Figs. 1, 2, 5 and 6 are connected with one another by pinions 75 so that the rolls 74 will rotate simultaneously in opposite directions. Secured to the shaft 76 of the lower roller 74 is a pair of ratchet wheels 77, Fig. 2. Also rotatably mounted on the shaft 76 is a ratchet arm 78 having a pawl 79 engageable with one of the wheels 77, whereby rotation of the arm 78 in a clockwise direction, as illustrated in Fig. 2, will rotate the ratchet wheels 77 and rolls 74. A stationary pawl 81 engageable with the other ratchet wheel 77 prevents counterclockwise rotation of the shaft 76. The arm 78 is connected through a link 82 to an arm 83 carried by the shaft 84. The latter is driven from the shaft 13 by means of the worm 85 and worm wheel 86 carried on the shafts 13 and 84, respectively. The shaft 84 is supported in operative position by the bearing members 87, which in turn are secured to a plate 88 mounted on the supporting frame 1 as in Fig. 4. Thus, as the shaft 84 is rotated by means of the worm and worm wheel, the feed rolls 74 will be intermittently rotated to advance the material being stitched. It will be apparent that by adjusting the length of the link 82 and varying the radial distance between the axis of the shafts 84 and the point of connection of the link 82 with the arm 83, the travel of the arm 78 and therefore the amount of rotation of the feed roll 74 may be varied. It will also be apparent that as the shafts 84 and 22 are both positively driven from the shaft 13 through their respective worms and worm wheels, the rotation of the feed rolls 74 will at all times be in synchronism with the reciprocation of the carriage. The relative adjustments of the carriage and feed rolls 74 is such that the latter will impart a feeding action to the material being stitched during the return movement of the sewing mechanism, while the latter is inoperative.

*Cut-off and foot lifting mechanism*

Figure 5:
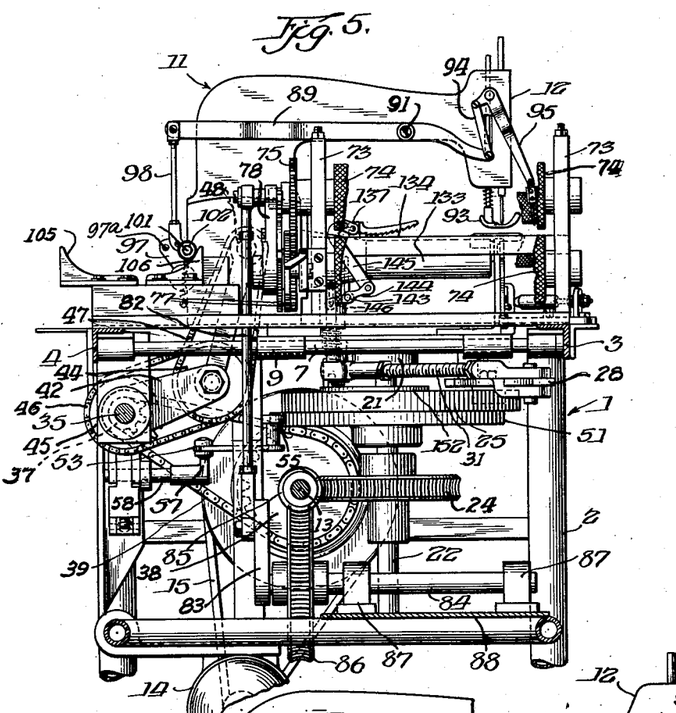
Fig. 5 is a sectional view taken approximately on the line 5—5 of Fig. 3.
Figure 7:
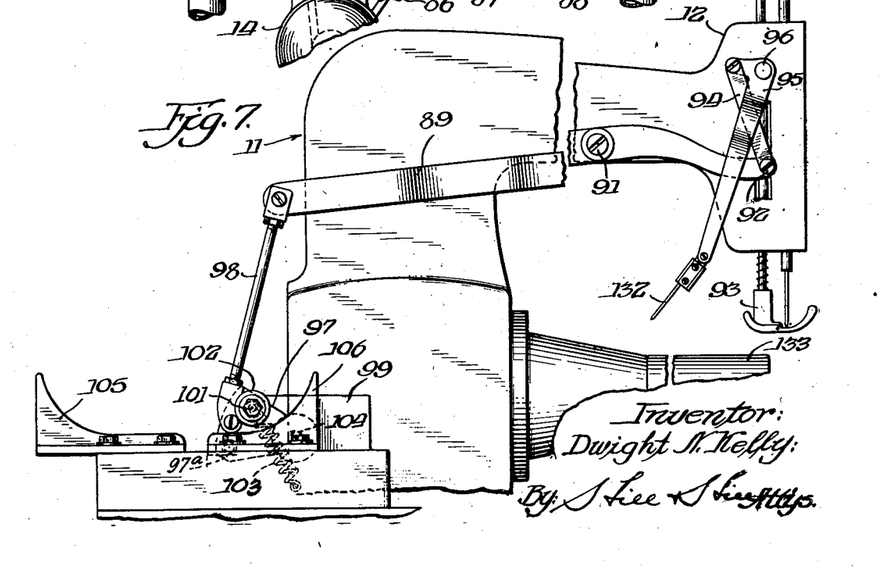
Fig. 7 is a side elevational view of a portion of the stitching mechanism illustrating the foot actuating and thread sweep actuating mechanism.

As previously mentioned, provision is made for cutting the thread at the end of the stitching operation and simultaneously with the cutting operation the foot of the sewing machine is lifted, remaining in this position until the sewing mechanism has been returned to its original position and ready to begin the next line of stitching. The details of the machine by which these functions are accomplished are illustrated in Figs. 7, 8, 9 and 10. Pivotally carried by the sewing head 11 as shown in Figs. 5 and 7 is an arm 89, the latter being pivotally connected to the head by a screw 91. One end of the arm 89 is operatively connected at 92 to the foot 93 of the sewing head. The arm is also connected by a link 94 to an arm 95 which is pivotally connected at 96 to the head. The opposite end of the arm 89 is pivotally connected to a plate member or rocker arm 97 by means of a link 98, the plate 97 being pivotally connected to a plate 99 rigidly secured to the head 11 and movable therewith. Carried by the plate 97 is a stud 101 having a roller 102 mounted thereon. A spring 103 connected at one end to an extension of the stud 101 and at the opposite end to a portion of the head 11, urges the plate 97 downwardly about its point of connection 104 with the plate 99. The roller 102 is engageable during reciprocation of the carriage and head 11 with cam blocks 105 and 106, respectively.

In their initial position the plate 97 and roller 102 are as illustrated in Fig. 5, with the foot 93 of the stitching mechanism in its downward position and the arm 95 in its forward position. As the carriage and head 11 reach the end of the stitching operation, the roller 102 will engage the cam member 106, which will rotate the plate 97 in a counterclockwise direction, whereby the spring 103 will draw the plate into the position illustrated in Fig. 7, thereby actuating the arm 89 and associated parts to raise the foot 93 and move the arm 95 into the position illustrated in Fig. 7. The plate 97 will remain in this position until the carriage and head have returned to their initial starting position, at which time the roller will engage the cam member 105, rotating the plate 97 back into the position illustrated in Fig. 5, the spring 103 maintaining the plate in this position until again actuated by the cam member 106. A pin 97a projecting laterally from the plate 97 engages the lower end of the link 98 (see Fig. 5) and limits the rotational movement of the plate caused by the tension of the spring 103 as it passes the pivot points 104 of the plate.

Figure 8:
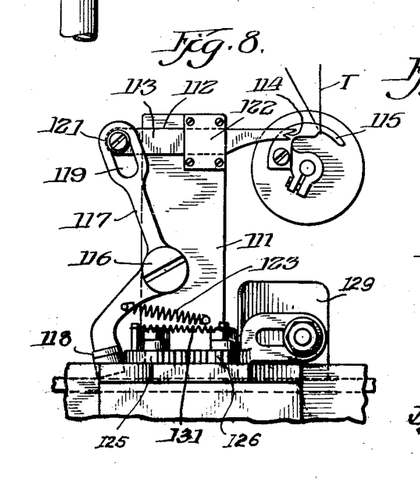
Fig. 8 is a front elevational view of the cutting mechanism for severing the thread at the end of the stitching operation showing the same in non-cutting position.
Figure 9:
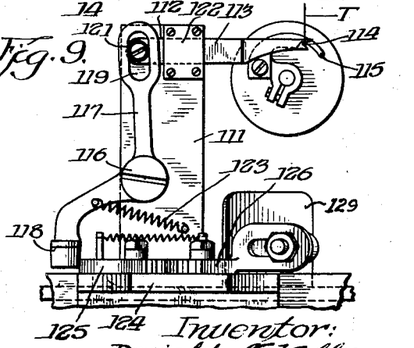
Fig. 9 is a similar view of the cutting mechanism illustrating the same in cutting position.

Mounted on the carriage 8 is a vertically extending plate 111, see Figs. 8 and 9, provided with a groove or channel 112 in which is slidably carried a cutter bar 113, the latter having a cutting edge 114 positioned adjacent the looper 115 of the sewing mechanism. Also pivotally carried by means of a screw 116 is an actuating arm 117, the latter having a roller 118 adjacent the lower end thereof and a slot 119 adjacent the upper end thereof. Carried by the bar 113 and positioned in the slot 119 is a roller 121. The cutter bar 113 is maintained in the slot 112 by means of a plate 122 secured to the supporting plate 111 by means of screws or the like, and a spring 123 secured at its ends to the arm 117 and plate 111, respectively, urges the arm 117 and cutter bar 113 into the position illustrated in Fig. 8.

Pivotally mounted on an extension 124 of the front member 3 of the supporting frame as best illustrated in Figs. 3 and 10 are a pair of gear segments 125 and 126 which are meshed with one another. Extending from the segment 125 is an arm 127 which is engageable with the roller 118, while extending from the segment 126 is a projection 128 engageable with the stop 129 mounted on the carriage 8. As the carriage nears the end of its forward or stitching movement, the stop 129 will strike the projection 128, thereby rotating the gear segment 126 which in turn will rotate the segment 125 and with it the arm 127. The latter at this point of operation is adjacent the roller 118 and will therefore pivot the arm 117 about the screw 116. Due to the engagement of the roller 121 in the slot 119 of the arm 117, the cutter bar 113 will be longitudinally moved into the position illustrated in Fig. 9, thereby engaging the cutting surface 114 with the thread T to sever the same. As the carriage returns to its original position, the roller 118 will disengage the arm 127 and the spring 123 will return the arm 117 and cutter bar 113 to their original position as illustrated in Fig. 8. Likewise, a spring 131 secured at its respective ends to the arm 127 and the frame member 3 will return the gear segments to their original position.

The actuation of the cutter bar 113 is timed with the actuation of the arm 89 so that the arm 95 will be actuated just prior to the actuation of the cutter bar 113. The end of the arm 95 is provided with an L-shaped wire extension 132 engageable with the thread so that when the arm 95 is actuated into its position illustrated in Fig. 7, the horizontal portion of the extension 132 will draw an additional amount of thread through the needle. Thus, after the thread has been severed there will be sufficient thread extending beyond the needle to eliminate any danger of the end of the thread being drawn from the needle by the action of the looper 115.

Hold-down mechanism

Extending across the lower portion 133 of the stitching mechanism is a plate 134, see Figs. 3, 5 and 6, the latter being rigidly carried by the upright 73 by means of the angle brackets 135. The plate 134 is of a general L-shape as best shown in Fig. 1 and is provided with a slot 136, Fig. 3, to permit passage of the foot 93 and needle of the stitching mechanism. Secured to the plate 134 is a block 137 which pivotally carries a U-shaped hold-down foot 138, the latter being rigidly connected to a shaft 139. Rigidly connected to the shaft 139 is a short lever 141.

Carried by the inner upright 66 is a bearing member 142 which pivotally carries a shaft 143. The latter is provided at one end with a short lever 144 operatively connected by the link 145 to the lever 141. Rigidly carried by the opposite end of the shaft 143 is another lever 146 which is operatively connected at its free end to a vertically extending rod 147, see Fig. 6, the latter being slidably mounted in a member 148 rigidly secured to the cross member 64. The rod 147 is urged in a downward direction by a spring 149 and is provided with a roller 151 engageable with a ramp or cam 152 mounted on the upper face of the cam disc 25. Thus, when the roller 151 is riding on the ramp 152 the hold-down foot 138 will be raised by means of the connecting links and shafts, while when the roller 151 drops off the ramp 152, the spring 149 acting through the various levers and links, will rotate the foot 138 to engage the material being stitched. The foot 137 prevents the material from moving transversely with the stitching mechanism as the latter moves across the material.

The complete operation

One end of the material to be stitched is placed between the rollers 68, 69 and the rollers 74. The stitching head is initially in a position adjacent the rear member 4, with the foot 93 and the needle positioned at the beginning of the line to be stitched. In such position the roller 102 is engaged with the cam member 105 and the carriage and head 11 are disposed in the position opposite to that illustrated in Fig. 5. The foot 93 is in its down position, as is the foot 138, to engage the material being stitched. Similarly, the clutch and stop motion mechanism 36 is in a position to lock the shafts 34 and 35 together. Thus, as power is applied, the carriage and head 11 will travel across the material and the stitching mechanism will be actuated to form a line of stitching extending transversely across the material. As the carriage and stitching mechanism nears the end of its forward travel, the roller 102 will engage the cam member 106 and the projection 128 of the cutter assembly will be engaged by the stop 129, so that as the carriage and head reaches the end of its travel, the sweep arm 95 will be actuated, whereby the extension 132 thereof will draw the thread through the needle, after which the thread will be cut by the cutter bar 113. Just before the arm 95 is actuated the cam 51, by means of the connecting links, etc., actuates the stop motion mechanism 36, whereby the same is thrown out of driving relation, disconnecting the shafts 34 and 35 and stopping the stitching mechanism with the needle in a raised or upward position. Upon the completion of the line of stitching, the roller 151 will engage the ramp 152 to raise the foot 138. The carriage and head will now begin to return to its original or initial position. Simultaneously with this return movement of the carriage, the feed rolls 74 will be rotated through their actuating mechanism to advance the material.

As the carriage reaches its initial position, the roller 102 will engage the cam member 105, returning the plate 97 to its original position and with it the arm 95, as well as dropping the foot 93 to its original position. At the same time the roller 151 will drop off of the ramp 152, thereby lowering the foot 138 and engaging the same with the material.

Likewise, the cam 51 will actuate the clutch and stop motion mechanism 36 to again engage the shafts 34 and 35 to operate the stitching mechanism and the machine will then form another line of stitching, repeating the cycle of operation just described.

Figure 11:
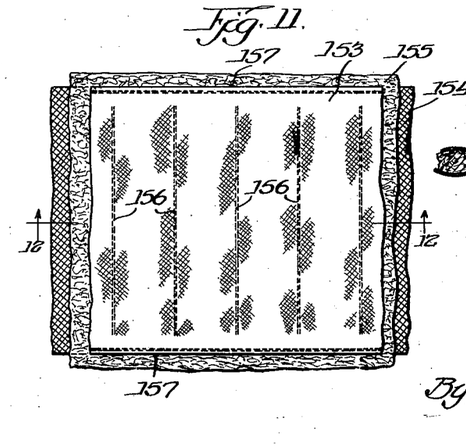
Fig. 11 is a plan view of the product adapted to be stitched on the machine illustrated.
Figure 12:
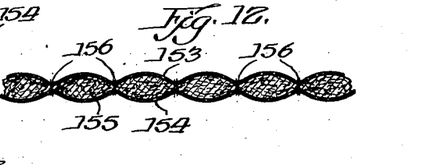
Fig. 12 is a sectional view taken approximately on the line 12—12 of Fig. 11.
Figure 13:
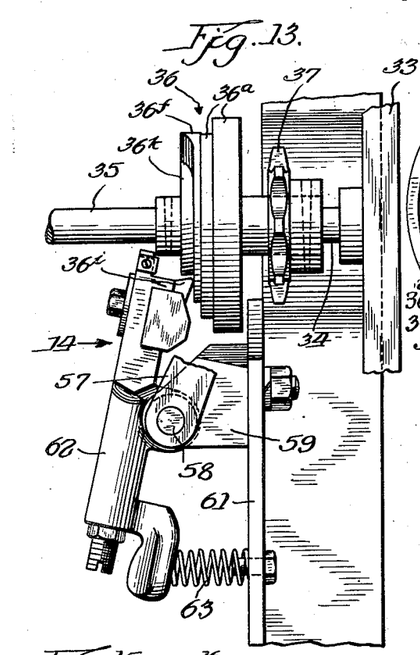
Fig. 13 is a detail side elevation on an enlarged scale of a certain stop motion clutch mechanism employed to stop the sewing machine.
Figure 14:
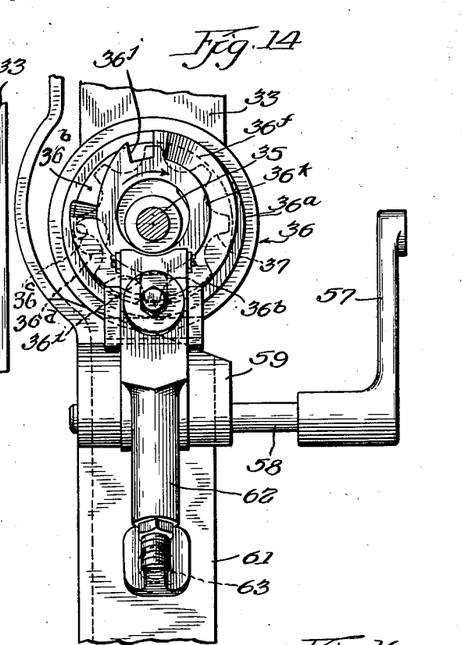
Fig. 14 is a front elevation of the mechanism seen in Fig. 13 looking in the direction of the arrow 14 in Fig. 13 with the shaft shown in section.

Illustrated in Figs. 11 and 12, is a sample of the type of work adapted to be performed by the machine just described, and illustrating a portion of a border boxing consisting of an outer ply 153 of material, an inner ply 154, with a layer of padding 155 interposed between the two plies.

It will be noted that with the present machine parallel rows of stitching 156 having their ends terminating at points spaced from the longitudinal edges 157 of the outer ply may be formed. By various adjustments of the machine the length of the stitching 156 may be varied to space the ends of the stitching any desired distance from the edges 157.

It will be apparent from the above description that I have provided a stitching machine of the kind described which will automatically form rows of stitching in a border boxing or other material in which the lines of stitching terminate within the confines of the material. Likewise, I have provided a machine which may be accurately adjusted and which is very dependable and efficient in operation.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a machine of the class described, the combination of a carriage, a stitching mechanism mounted thereon, means for intermittently feeding a plurality of plies of material into said stitching mechanism, means for reciprocating said carriage and therewith the stitching mechanism transversely across said material intermediate of the feeding movement thereof, means for stopping said stitching mechanism to terminate the lines of stitching intermediate the edges of said material with the needle disengaged from the latter, thread cutting means mounted on and moving with the carriage for cutting the thread adjacent the face of an inner ply of the material, and cutter actuating means, carried in part by the carriage and in part by a stationary member of the machine for actuating the thread cutting means at the end of the stitching operation.

2. In a machine of the class described, the combination of a carriage, a stitching mechanism mounted thereon, means for intermittently feeding a plurality of plies of material into said stitching mechanism, means for reciprocating said carriage and therewith the stitching mechanism transversely across said material intermediate of the feeding movement thereof, means for stopping said stitching mechanism to terminate the lines of stitching intermediate the edges of the material with the needle disengaged from the material, means for drawing additional thread through the needle at the end of the stitching operation, thread cutting means mounted on and moving with the carriage for cutting the thread adjacent the face of an inner ply of the material subsequent to the drawing of said thread through the needle, and means carried in part by the carriage for actuating the thread cutting means.

3. In a machine of the class described, the combination of a supporting base, a carriage movably carried thereby, a stitching mechanism mounted on said carriage, means for reciprocating said carriage relative to said base for forming a line of stitching, a thread cutter mechanism carried by said carriage for severing the thread at the end of the stitching operation, and cutter actuating means carried by said base, engageable with a portion of said carriage for actuating said thread cutter mechanism at the end of the stitching operation.

4. In a machine of the kind described, the combination of a supporting base, a carriage movably carried thereby, a stitching mechanism mounted on said carriage, means for reciprocating said carriage relative to said base for forming a line of stitching, a cutter slidably carried by said carriage having a cutting edge adjacent the thread looper of said stitching mechanism for severing the thread at the end of the stitching operation, an arm pivotally carried by said carriage and operatively connected to said cutter, a stop carried by said carriage, a pair of meshed gear segments carried by said supporting base, said segments each having a projection thereon, said projections engageable when the carriage is adjacent said segments with said arm and stop respectively whereby movement of said carriage relative to said supporting base is transmitted to said cutter to actuate the latter, and resilient means for urging said cutter into a non-cutting position.

5. In a machine of the kind described, the combination of a supporting base, a carriage movably carried thereby, a stitching mechanism having a stitching needle mounted on said carriage, means for reciprocating said carriage relative to said base for forming a line of stitching, means for drawing additional thread through said needle at the end of the stitching operation, a cutter slidably carried by said carriage having a cutting edge adjacent the thread looper of said stitching mechanism for severing the thread subsequent to the drawing of the thread through the needle, an arm pivotally carried by said carriage and operatively connected to said cutter, a stop carried by said carriage, a pair of meshed gear segments carried by said supporting base, said segments each having a projection thereon, said projections engageable when the carriage is adjacent said segments with said arm and stop respectively whereby movement of said carriage relative to said supporting base is transmitted to said cutter to actuate the latter, and resilient means for urging said cutter into non-cutting position.

6. In a machine of the kind described, the combination of a bodily movable carriage having stitching mechanism thereon including a stitching needle and a thread looper cooperable therewith, a rocker arm pivotally carried by said mechanism operatively connected to the material engaging foot thereof, a thread engaging member operatively connected to one end of said arm and movable across the path of the needle, operative to draw additional thread through said needle, a second rocker arm carried by said mechanism, a link connecting said rocker arms, and cam means fixedly mounted adjacent the path of movement of the second named rocker arm for actuating the same and therewith actuating the material engaging foot and the thread engaging means.

7. In a machine of the kind described, the combination of a supporting base, a stitching mechanism movably carried thereby, means for reciprocating said mechanism transversely across said base, said mechanism having a stitching needle and a thread looper cooperable therewith, a rocker arm pivotally carried by said mechanism, a thread engaging member pivotally carried intermediate its ends by said mechanism and operatively connected at one end to the adjacent end of said rocker arm, a portion of said member being movable across the path of the needle, operative to draw additional thread through said needle, a second rocker arm carried by said mechanism, means operatively connecting said rocker arms, resilient means to hold the second named rocker arm in one position and therewith hold the foot in its lifted position, and a pair of spaced cam members mounted on said base, one engageable at the termination of the forward movement of said stitching mechanism with said second named rocker arm for resetting the latter from its foot lifting position, and the other cam member operating to restore the second named rocker arm to its position holding the foot down.

8. In a machine of the class described, the combination of a stitching mechanism, means for intermittently feeding a plurality of plies of material into said mechanism, means for reciprocating said mechanism transversely across said material intermediate of the feeding movement thereof, a hold down member positioned adjacent the upper face of said material, a pivot member for supporting said hold down member for swinging movement in a plane transverse to the line of travel of said material and engageable with the latter to prevent transverse movement of said material during the operation of said stitching mechanism, a rotatable disc carried for pivotal movement about a vertical axis and adjacent the path of the stitching mechanism, means for rotating said disc in synchronism with said mechanism, a ramp carried by the upper face of said disc, a follower member engageable with said ramp and operatively connected to said hold down member for actuating the latter, and resilient means urging said follower member towards said ramp.

9. In a machine of the class described, the combination of a supporting base, a stitching mechanism movably carried thereby, means for intermittently feeding a plurality of plies of material into said mechanism, means for reciprocating said mechanism transversely across said material intermediate of the feeding movement thereof, a hold down member pivotally mounted on a portion of said base to swing transversely across the path of said material and positioned adjacent the upper face of said material and engageable therewith to prevent transverse movement of said material during the operation of said stitching mechanism, a disc mounted for rotation in a horizontal plane, means for rotating said disc in synchronism with said mechanism, a ramp carried by the upper face of said disc, a follower member slidably carried by a portion of said base and engageable at one end with said ramp, means for operatively connecting said follower member to said hold down member, said ramp operative upon engagement with said follower member to disengage said hold down member from the material and resilient means for urging said follower member towards said ramp and said hold down member into engagement with the material.

10. In a machine of the class described, the combination of a supporting frame, a pair of ways carried by said frame, a carriage slidably carried by said ways, a stitching mechanism mounted on said carriage, a vertically extending cam shaft, a slotted cam disc carried by said shaft, a lever pivotally connected adjacent one end to a part of said frame, and having a roller positioned in the cam slot of said disc, an adjustable link pivotally connected at its respective ends to said lever and said carriage, a jack shaft journaled in said frame, means for simultaneously driving said shafts, means operatively connecting said jack shaft and the drive shaft of said stitching mechanism, a stop motion clutch interposed between said driving means and the drive shaft of said stitching mechanism operative to disconnect said stitching drive shaft from said driving means and stop the stitching mechanism with the needle thereof in a raised position, a second cam carried by said cam shaft, means operatively connecting said cam and clutch to actuate the latter and stop said stitching mechanism while the latter is returning to its initial stitching position, means for feeding material through said stitching mechanism during the return movement of said carriage while said stitching mechanism is inoperative, means for drawing additional thread through the needle of said stitching mechanism at the end of the stitching operation, and means for cutting the thread subsequent to the drawing of thread through said needle.

DWIGHT N. KELLY.